US 6,408,404 B1

(12) United States Patent
Ladwig (10) Patent No.: US 6,408,404 B1
(45) Date of Patent: Jun. 18, 2002

(54) SYSTEM AND METHOD FOR ENSURING AND MANAGING SITUATION AWARENESS

(75) Inventor: Michael D. Ladwig, Reston, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/124,002

(22) Filed: Jul. 29, 1998

(51) Int. Cl.⁷ .............................................. G06F 11/00
(52) U.S. Cl. ....................................................... 714/39
(58) Field of Search ...................... 714/47, 57; 702/188

(56) References Cited

U.S. PATENT DOCUMENTS

| 5,555,346 A | | 9/1996 | Gross et al. |
| 5,787,253 A | * | 7/1998 | McCrery .................... 709/231 |
| 6,192,364 B1 | * | 2/2001 | Baclawski .................... 707/10 |

FOREIGN PATENT DOCUMENTS

| EP | 0537098 A2 | 4/1993 |
| EP | 0822499 A1 | 2/1998 |
| WO | WO97/39406 | 10/1997 |
| WO | WO98/26541 | 6/1998 |

OTHER PUBLICATIONS

"Lifestreams: A Storage Model for Personal Data", by Eric Freeman, et al., SIGMOD Record, vol. 25, No. 1, Mar. 1996, pp. 80–86.
"FGP: A Virtual Machine for Acquiring Knowledge from Cases", by Scott Fertig, et al., IJCAI–91: proceedings of the Twelfth International Conference on Artificial Intelligence, Sydney, Australia, Aug. 24–30, 1991, pp. 796–802.
"It's 10 O'Clock: Do You Know Where Your Data Are?", Terry Cook, Technology Review, Jan. 1995, pp. 49–53.
"Northwest Artificial Intelligence Forum", Eric Freeman, et al., NaiF Journal Vol. 6, pp. 1–16.
"Glimpse: A Tool to Search Entire File System", U. Manber, et al., UNIX Search Engine, pp. 1–3.
Glimpse: A Tool to Search Through Entire File Systems, U. Manber, et al., Department of Computer Science, University of Arizona, Oct. 1993, pp. 1–10.

* cited by examiner

Primary Examiner—Robert Beausoleil
Assistant Examiner—Bryce P. Bonzo
(74) Attorney, Agent, or Firm—Lowe Hauptman Gilman & Berner, LLP (57) ABSTRACT

Disclosed is a method and apparatus in which one or more data streams are sent to a computer and the data streams are sorted using a rule base into streams representative of events. The incoming data streams can be sent by hunter agents which search for specified types of data and forward the data to the computer. The incoming data stream can also be sent by a gatherer agent. The incoming data stream can also be incoming message traffic such as e-mail and other types of message traffic data. The incoming message traffic data is then sorted into event streams and can be displayed as event streams on a time line. Actions can be taken based upon specified events. Thus, events from disjointed sources can be sorted and displayed in a unified manner in which a user can readily and quickly know which events have occurred for a particular issue, such as a forest fire, hospital patient, etc.

33 Claims, 7 Drawing Sheets

Figure 10 - Event Stream Display

Figure 4 - Event Explorer Window

Figure 5 - Stream Rules / Criteria Window

Figure 6 - Stream Actions / Matched Tasks Window

Figure 7 - Stream Management / General Window

Figure 8 - Stream Management / Substreams Window

Figure 9 - Event Search Window

SYSTEM AND METHOD FOR ENSURING AND MANAGING SITUATION AWARENESS

FIELD OF THE INVENTION

The present invention relates generally to monitoring of data streams, and more particularly, relates to providing situation awareness by monitoring incoming data streams using a rule base. The incoming data streams can be sent by hunter and gatherer agents or can be incoming message traffic.

BACKGROUND OF THE INVENTION

In government and commercial environments, human activity is directed at understanding events in the real world and solving problems based on that understanding. This process is called Situation Awareness.

Rapid advances in computer technologies such as remote sensing, networking and data mining have in many cases overwhelmed organizational and visualization tools used to interpret and respond to the information. As autonomous intelligent agents and subscription-based "push" technology becomes commonplace, this flood of information will increase to tidal wave proportions.

The traditional response to these types of problems has been to build an individualized user environment tuned carefully to the needs of the specific problem to be solved. Each type of data processed or produced by the system has a customized user interface dedicated to exploiting it.

While this approach can be effective, experience has shown that it is also often expensive and high-risk to build such systems. A major reason is that there is little opportunity for code reuse; the system must be built from the ground up. After becoming operational, these systems tend to be hard to adapt to changes in an organization's workflow process. These factors led us to seek "horizontal" system architectures and end user environments; as the problem of data overload becomes part of everyone's experience, the need for such solutions becomes urgent.

Intelligent systems have been developed which are focused on the needs of situation awareness users. These systems shared a common internal system architecture that significantly lowered system development cost and risk. The flexibility of the architecture was demonstrated when it solved a wide variety of user problems including terrorist activity analysis, low intensity conflict monitoring, military intelligence, and strategic threat assessment. However, the goal of a generic user environment remained unrealized throughout this period. Some generic, reusable user tools could be developed, but most had to be closely linked to the problem being solved.

SUMMARY OF THE INVENTION

It is, therefore, an object of the present invention to provide a method and apparatus for monitoring and sorting incoming data streams using a rule base.

It is another object of the present invention to provide incoming data stream which is sent by hunter agents and gatherer agents to a presence.

It is another object of the present invention to provide a rule base which can sort the incoming data streams and provide a display of an event stream on a time line.

These and other objects of the present invention are achieved by a method and apparatus in which one or more data streams are sent to a computer and the data streams are sorted using a rule base into streams representative of events. The incoming data streams can be sent by hunter agents which search for specified types of data and forward the data to the computer. The incoming data stream can also be sent by a gatherer agent. The incoming data stream can also be incoming message traffic such as e-mail and other types of message traffic data. The incoming message traffic data is then sorted into event streams and can be displayed as event streams on a time line. Actions can be taken based upon specified events. Thus, events from disjointed sources can be sorted and displayed in a unified manner in which a user can readily and quickly know which events have occurred for a particular issue, such as a forest fire, hospital patient, etc.

The foregoing objects of the present invention are also achieved by a method for monitoring an incoming data stream for specified events. At least one data stream is received at a computer, the data stream including data representative of events. Rules are applied to the data stream for sorting data representative of events and for taking an action based on a specified event.

The foregoing objects of the present invention are also achieved by an article including at least one sequence of machine executable instructions. A medium bears the executable instructions in machine readable form, wherein execution of the instructions by one or more processors causes the one or more processors to receive at least one data stream at a computer, the data stream including data representative of events. The processors apply rules to the data stream for sorting data representative of events and for taking an action based on a specified event.

The foregoing objects of the present invention are also achieved by a computer architecture for monitoring an incoming data stream for specified events. The computer architecture includes receiving means for receiving at least one data stream at a computer, the data stream including data representative of events. The computer architecture also includes applying means for applying rules to the data stream for sorting data representative of events and for taking an action based on a specified event.

The foregoing objects of the present invention are also achieved by a computer system including a processor and a memory coupled to the processor, the memory having stored therein sequences of instructions, which, when executed by the processor, causes the processor to perform the following steps. At least one data stream is received at a computer, the data stream including data representative of events. Rules are applied to the data stream for sorting data representative of events and for taking an action based on a specified event.

Still other objects and advantages of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for monitoring of incoming data streams and sorting the incoming data streams into event streams according to the present invention are described. In the following detailed description, for purposes of explanation, numerous specific details are set forth in order to provide a thorough understanding of the present invention. It will be readily apparent, however, that the present invention may be practiced without these specific details. In other instances, well-known structures and devices are shown in block diagram form in order to unnecessarily obscure the present invention.

Hardware Overview

Figure 1:
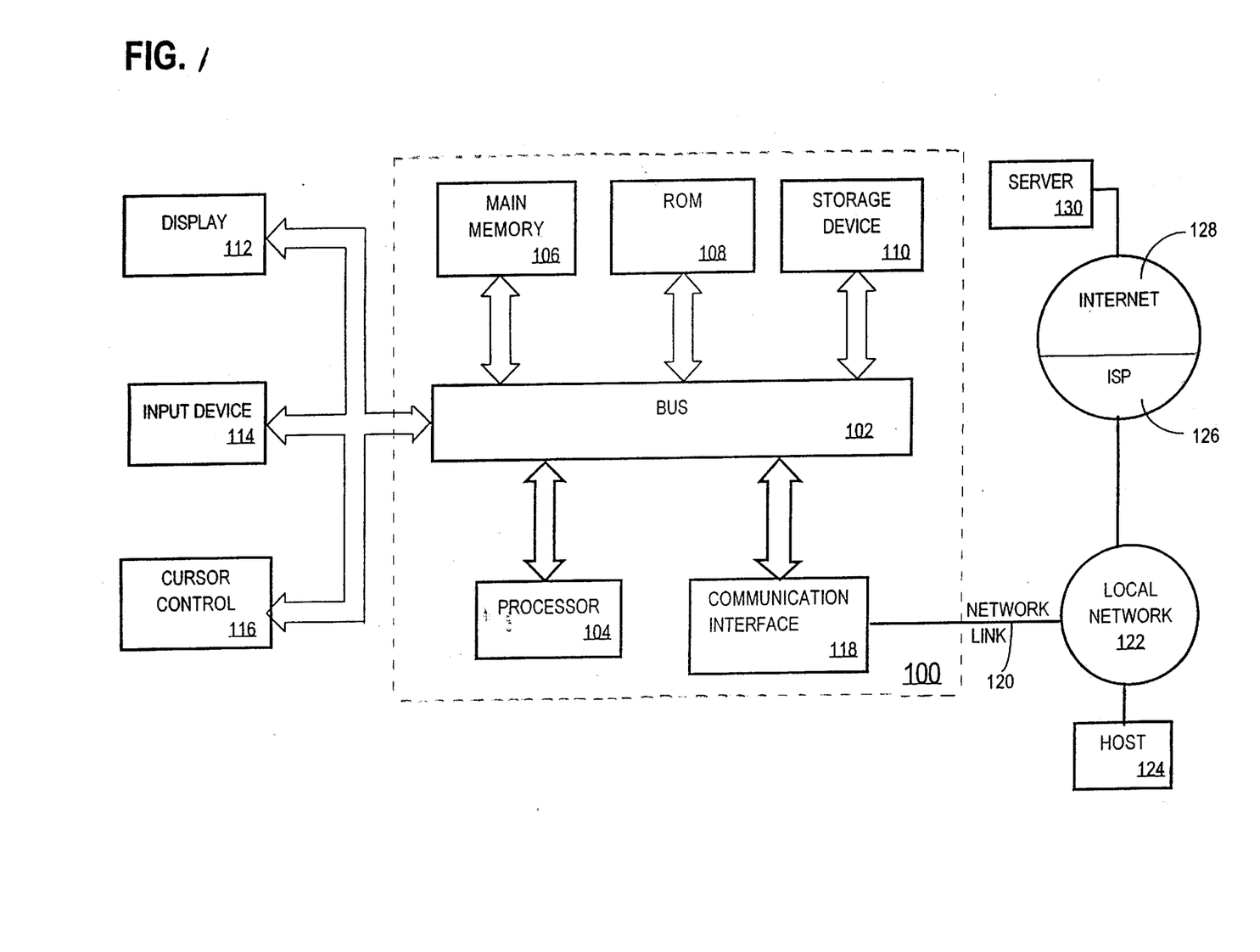
FIG. 1 is a high level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like. The computer system 100 can be a "presence" as described below.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display enterprise architecture information. According to one embodiment of the invention, enterprise architecture information and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the enterprise architecture information. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Figure 2:
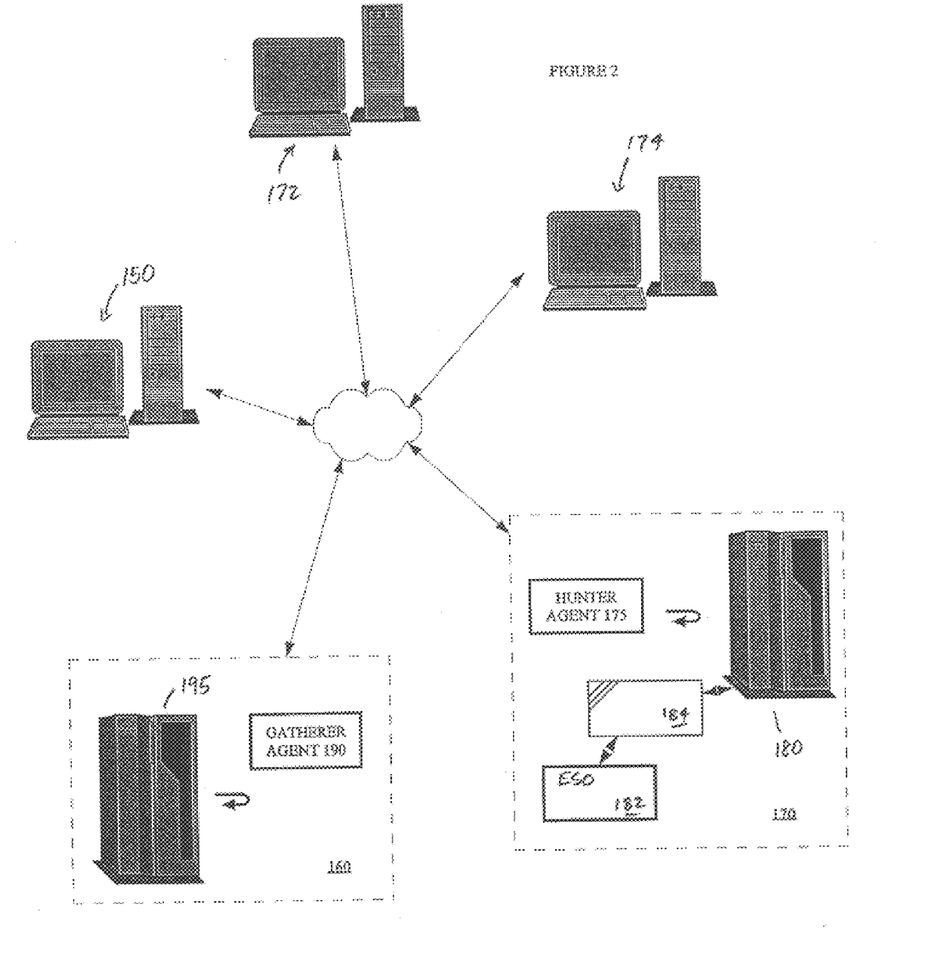
FIG. 2 is a block diagram of an exemplary network architecture usable with the present invention.

As depicted in FIG. 2, a network usable with the present invention includes a presence 150, a computer system 160 and a computer system 170 connected to a network such as the Internet. The network illustrated in FIG. 2 can also be called a virtual space. Other types of networks such as local area networks, wide area networks and the like can also be used with the present invention. The presence 150 includes the computer software used in the present invention. Other computer systems including the depicted computer systems 172 and 174 generate message traffic which is sent to presence 150. The presence 150 is expecting the event stream sent by the gatherer agent to be of a predetermined format. The presence 150 is configured to be able to use this native format information and, if necessary, perform a transformation.

Computer system 170 includes an illustrated hunter agent 175 and a message database 180. The hunter agent 175 is sent by the presence 150 to the computer system 170. The message database 180 can receive information from many sources such as a satellite link. Functionally, an agent is computer software, transportable over a computer network from one computer to another, to implement a desired function on the destination computer. An agent can also be defined as a transferable self-contained set of executable code instructions. The hunter agent 175 uses information contained in the message database 180 to create and send an event stream object (ESO) 182 to the presence 150. A relationship 184 exists between the ESO 182 and the message database 180. The hunter agent 175 has to go out and look for information contained in databases throughout the network. The hunter agent can transform the events into a standardized format for use by the presence 150 which can include at least some of the following information associated with each event: type, title, datetime, keywords, summary, priority, and duration.

Computer system 160 includes an illustrated gatherer agent 190 and a database 195. The gatherer agent 190 is sent by the presence 150 to the computer system 160. The database 195 can receive information from many sources such as the illustrated satellite link. The gatherer agent 190 sends information to the presence 150. The gatherer agent 190 relays information to the presence in a native format as the information is updated at the database 195. The events will have at least some of the following information associated with each event: type, title, datetime, keywords, summary, priority, and duration.

Figure 2A:
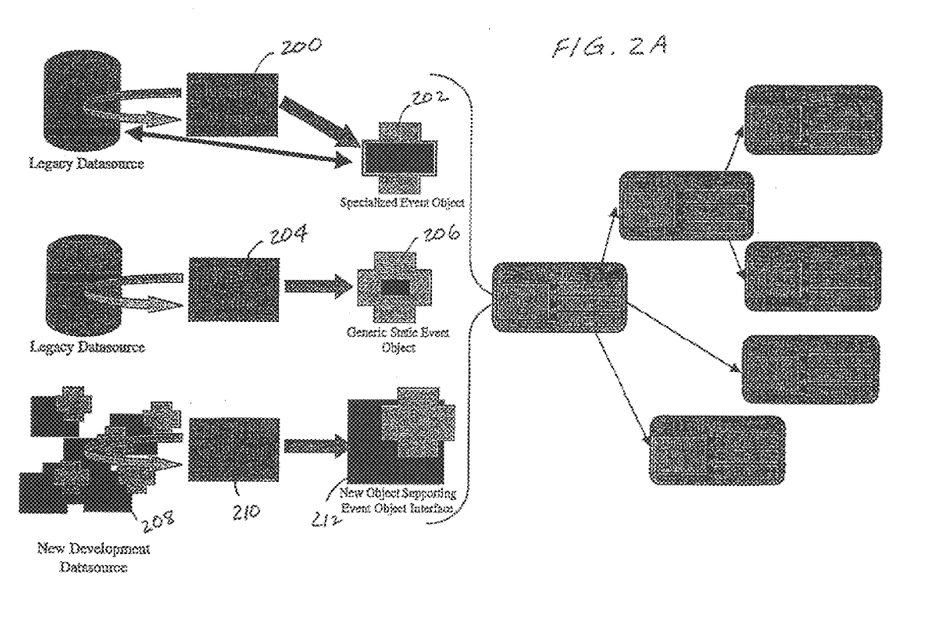
FIG. 2A is a schematic illustration of various event stream objects usable in the present invention.

There are three basic types of event stream objects as used by a cluster of presence entities, as illustrated in FIG. 2A.

The first, "Hunter Dynamic" 200, depicts the extraction of event information from a legacy data source. In this case, a specialized event stream object 202 to the particular legacy data type is created to represent the data source record. This specialized object 202 retains a pointer back to the original record, allowing it to extract additional information and update information as appropriate.

The second, Hunter Static" 204, also depicts the extraction of event information from a legacy data source. In this case, however, a generic event stream object 206 is created and the standard information elements are "filled in" as appropriate.

Third, the "Gatherer" approach shows the identification of newly created information in "new development" data sources 208. In this case, it is assumed that the information objects 210 were developed with the standard event stream interface 212 and elements in mind, and can thus be used by the presence 150 with no additional modification.

Finally, FIG. 2A depicts each of the event stream objects being sent to the top-level presence entity 150 for its use, and any delegated use by subordinate presence objects.

Figure 3:
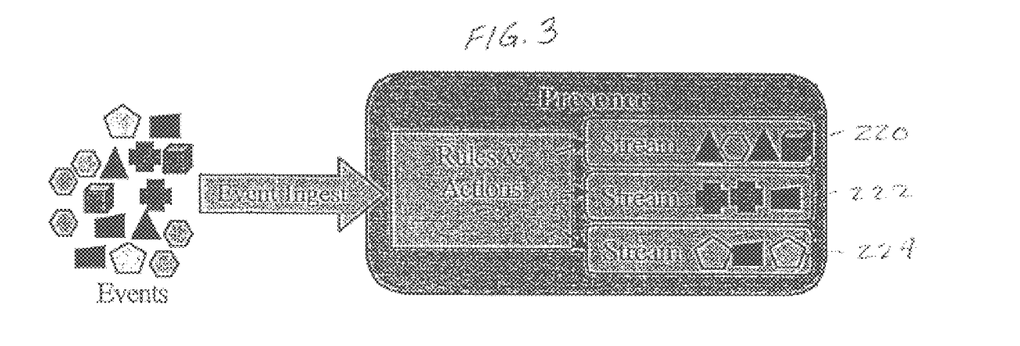
FIG. 3 is an illustration of events being ingested by a presence and sorted using rules and actions into streams.

As illustrated in FIG. 3, events are sent by computer systems 160, 170, 172, 174 to the presence 150. Preferably, the events or event streams sent by the computer systems 160, 170, 172, 174 are in a standardized format and include the information listed above for the hunter 175 and gatherer 190 agents. It may be necessary to have separate code at the presence 150 for standardizing the incoming message traffic. The presence 150 includes the inventive computer software for applying rules and taking actions of the events ingested by the presence 150 and sorting the ingested events into streams of events 220, 222, 224. Only three streams are depicted although the present invention is not limited to any specific number of streams. Events received by a presence are usually organized into logical groupings known as streams. These streams can be used to systematize information. The stream names are devised by the user and events are moving onto streams through the automatic application of rules created by the user.

With the previous description in mind, before describing the present invention in further detail, some paradigms and definitions are provided. Because of the popularity of "desktop metaphor" user environments such as Apple's Macintosh and Microsoft's Windows, most everyone is familiar with the spatial visualization of hierarchical organizations as "documents" contained within "folders". Like file cabinets in the real world, such an organization can be effective if the user has a limited quantity of fairly static information.

As the information the user handles becomes increasingly "active", the user must spend a greater amount of his or her time managing the organization—removing outdated information, filing freshly received reports and organizing new assignments.

The present invention replaces the static spatial metaphor with one based on a dynamic temporal flow. In the present invention, information is presented as events spread over a timeline with a past, present and future. This organization provides the user with an "as it happens" record of the things that occur, tasks assigned to the user and actions taken by the user.

Event and streams are manipulated with a set of commands that make it easy to organize, analyze, and exploit the information that makes up the virtual world of the user. The building blocks of the present invention—Presence, Event and Stream are discussed below.

Event

An event represents something that happened in the "real" world. The event can be a value received from a sensor, results from an expert system analysis, a work assignment from a supervisor or a request from a co-worker that the user approve a decision.

Figure 4:
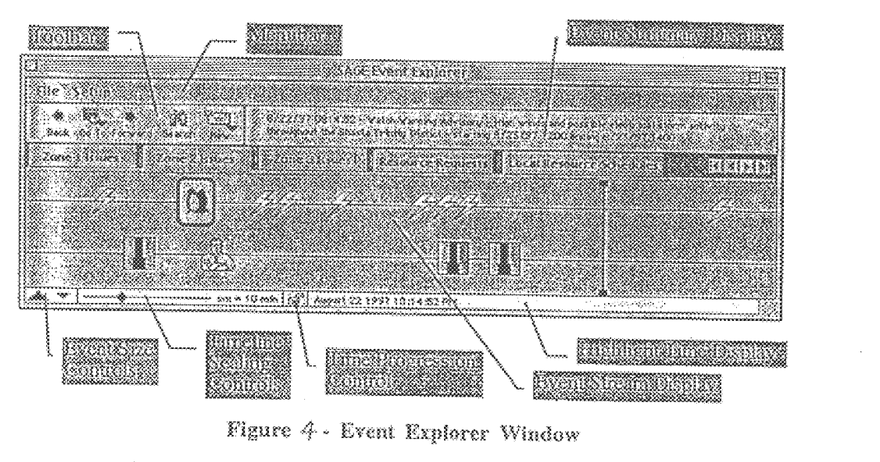
FIG. 4 is an illustration of an event explorer window.

An event is composed of a number of standardized elements; it also allows for an infinite variety of extensions specific to the "something" that it represents. An example of an event summary is illustrated in FIG. 4 as the event summary display. The following are standardized elements of an event:

Type—the type of event.

Title—the "name" of the event.

Datetime—an event "happens" at a particular date and time.

Keywords—a list of words that describe the event.

Summary—a brief overview of the information in the event.

Priority—the importance of an event; there are five levels described.

Duration—the length of time that an event occurred (optional).

An event also has a standardized set of operations that can be performed on it. These are:

Copy—add a reference to the event to some other presence.

Move—move the current event reference to some other presence.

Delete—remove the current event reference.

Display—display the full information represented by the event.

In addition to these operations, event types can define custom operations that can be performed on a given event. In the case of an event representing the arrival of a mail message, possible extended options could be to "Reply" or "Forward" it. An event representing the "crash" of a computer system could offer the user extended options related to dealing with it, such as "Attempt Restart" or "Submit Service Order". Events representing occurrences with a geo-spatial dimension, such as power outage reports, could offer the user extended options relating to charting their location on a map.

Presence

A presence represents an individually identifiable entity within the virtual space. The user is a presence, as are co-workers. Organizational departments such as maintenance or publications could also be represented by a presence. Although only one presence is depicted in FIG. 2, there can be many presences in the virtual space.

A presence is the basic unit for external interaction or collaboration within the virtual space. The user receives information and assignments from other presence entities. Should the user want to send information or a request elsewhere, the user targets a presence to receive the information.

A presence is working all the time, whether the user is logged on to a computer or not. The presence is always available to receive and act on incoming events. When an event is received by the presence, it follows instructions that help the presence to determine what, if anything, to do with the event. These instructions are called rules and are made from two components: criteria and actions.

Figure 5:
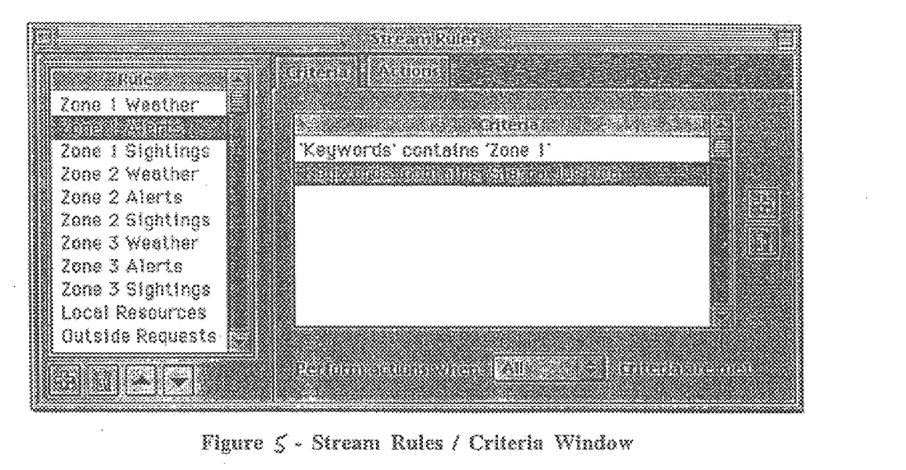
FIG. 5 is an illustration of a stream rules/criteria window.

Criteria are simple statements that examine the values of the standardized data elements in the event. An example of a criteria statement might be "Type is equal to Lightning Strike". A rule can have many individual criteria statements, and a rule can require that either all, any, or none of the individual criteria statements be satisfied. Examples of stream rules are depicted in FIG. 5.

Figure 6:
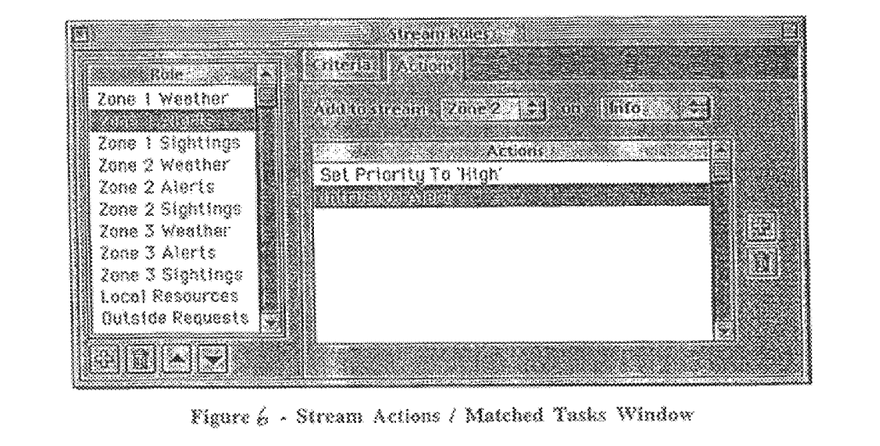
FIG. 6 is an illustration of a stream actions/matched tasks window.

Using a rule, after the processor 104 in presence 150 has determined that the criteria have been met for a particular event, actions can then be performed. Actions are commands that the presence 150 can perform to help filter, organize, and exploit information sent by the hunter agent 175, gatherer agent 190 and other incoming message traffic from computer systems 172, 174. Organizational actions let the user file incoming information in the user's personal organizational scheme. For example, streams 220, 222, 224 in FIG. 3 can be stored in separate files. As illustrated in FIG. 4, there are five separate files associated with five sorted streams: zone 1 issues, zone 2 issues, zone 3 issues, resource requests and local resource schedules. Other actions allow the user to have the information automatically brought to the user's attention with various notification mechanisms such as alert windows, flashing icons, email or beeper notification as depicted in FIG. 6.

The user interacts with the computer software of the present invention through a graphical user interface (GUI) application. The GUI is a tool for organizing and browsing information sent to the user's "presence".

When the user first launches the computer software of the present invention, a window like the one illustrated in FIG. 4 will appear. This window has seven areas: Toolbar, Summary Panel, Event Size Controls, Timeline Scaling Controls, Time Progression Mode Control, Highlight Time Display and the EventStream Display.

Selecting the "setup" menu in FIG. 4 offers the user three choices: Stream Rules (FIGS. 5 and 6), Stream Management (FIGS. 7 and 8) and Preferences. The first two choices "Stream Rules" and "Stream Management" are discussed below.

The Preferences choice brings up a window allowing the user to configure, for example, ease-of-use (e.g., keyboard shortcuts) and cosmetic (e.g., window color) features.

Stream Rules

Selecting "stream Rules" brings up a window like the one shown in FIG. 5. The window illustrated in FIG. 5 allows the user to create rules which check each event received in the data stream against criteria. If all criteria are matched then matched actions (FIG. 6) are performed; likewise a failure to match all criteria can cause unmatched actions to be performed. The criteria are formed by simple pattern matching statements allowing the user to compare the contents of fields in each event with values selected by the user. These statements allow the user to, for example, check the type of event, time it occurred, and the contents of the event's keyword list.

The actions that can be performed in the "Matched" or "Unmatched" cases include placing an event on one or more streams, informing the user via alert or sound, or deleting the event. Other operations appropriate to your environment may be available as well.

Figure 7:
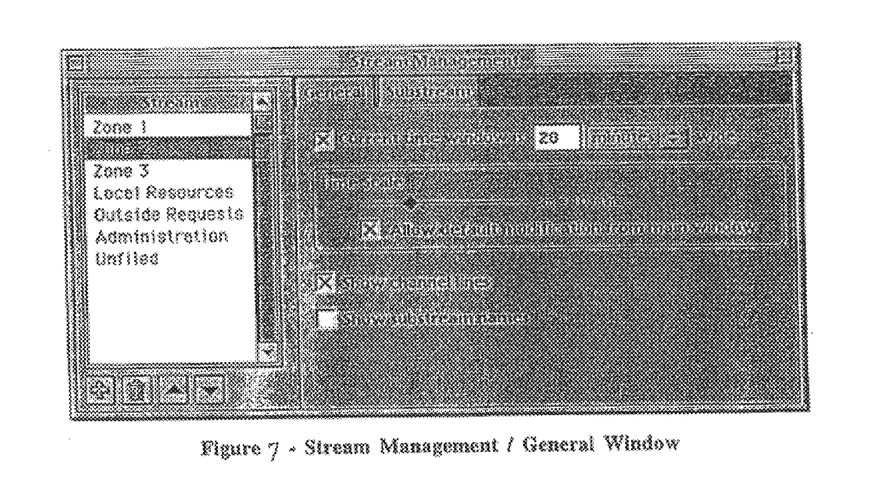
FIG. 7 is an illustration of a stream management/general window.
Figure 8:
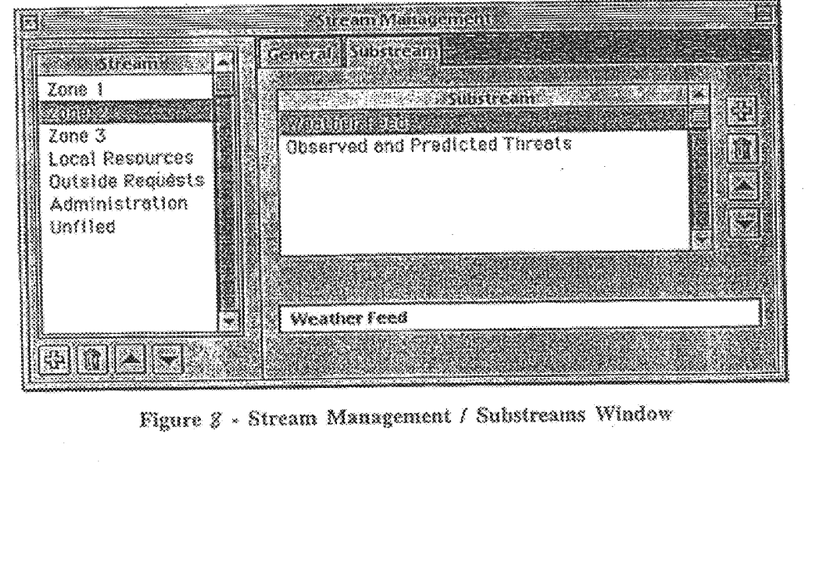
FIG. 8 is an illustration of a stream management/ substreams window.

Selecting "Streams Management" from the "Setup" menu will open the window illustrated in FIG. 7 to appear. In this window, the user can set preferences for each stream. With a stream selected in the leftmost list, the user can set general preferences for the stream and create, edit or modify display substreams (FIG. 8) for the stream. Display substreams are simply a means available to "declutter" a display of events within a stream.

Toolbar

The toolbar offers five commands. The five commands are:

Back—Shift stream display to show older events.

Go To—Shift stream display to center a particular time on the display.

Forward—Shift stream display to show more recent events.

Search—Search the stream for events matching some criteria.

New—Create a new event and place it on a stream.

Pressing "Go To" pops up a menu where the user can either center the current time on the display (the default action), or enter a datetime to center the display on.

Pressing "New" pops up a menu where the user can select a type of event to be created. Once the user makes a selection, the event will be created, and a window will be created to specify the event information. The event types available and the interface used to specify them will vary from system to system.

Search

Figure 9:
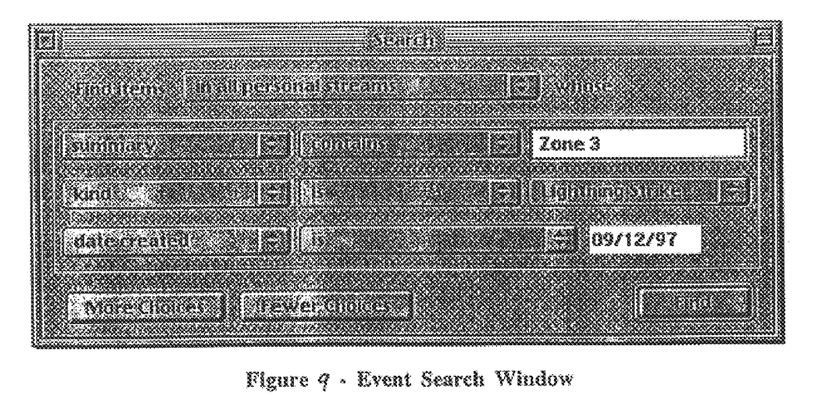
FIG. 9 is an illustration of an event search window.

Pressing "Search" brings up a window like the one illustrated in FIG. 9. Within this window, search criteria can be entered to locate a particular event. Pressing "Find" will cause the computer software to focus on the desired event. If more than one matching event is found, repeatedly selecting "Find" will bring each up in succession.

Event Summary Display

Figure 10:
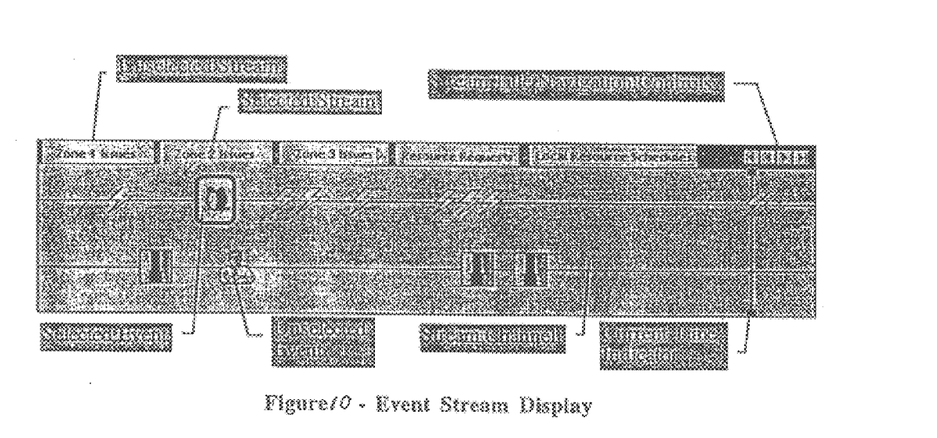
FIG. 10 is an illustration of an event display stream.

The output of the sorted, selected and displayed event streams is depicted in the Event Stream Display in FIG. 10. The top part of the display is the Stream Selection area and allows the user to select a stream to be displayed. There can only be one stream selected. If the user has more streams than can be displayed in the Stream Selection area, the Stream Title Navigation Controls will be active, allowing the user to move within a list of stream titles.

The titles displayed in the Stream Selection area may present cues to any unacknowledged priority events within the stream. The color coding (black, yellow and red) indicates increasing levels of significance. If the title itself is yellow or red, it means that there is a priority event within the "current time" window. The size of this window is configurable via the "Streams Management" window in illustrated in FIG. 7. Similarly, colored markers before or after the title text indicates the presence of unacknowledged priority events before or after the current time window.

Immediately below the Steam Selection area is where events are displayed. A stream can have several substreams, and the display in FIG. 10 illustrates a stream with two substreams.

The Current Time Indicator shows the user where the current time is centered on the display. The default location for this indicator (useful when using the "Now" toolbar command) can be moved from side to side by using the small square handles at the ends of the indicator.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of monitoring a computer network for specified events at a presence, comprising:
    gathering heterogeneous data at two or more remote computers and placing the gathered data in a data stream and forwarding the data stream to the presence;
    receiving, at the presence, the at least one data stream sent from the two or more remote computers, the data stream including data representative of events;
    applying rules to the at least one data stream at the presence for sorting data representative of events and for taking one or more actions based on a specified event; and
    hunting for predetermined data at a remote computer and placing the hunted data in a data stream and forwarding the data stream to the presence.

2. The method of claim 1, comprising displaying events associated with a selected data stream on a time line wherein the data stream comprises heterogeneous elements.

3. The method of claim 1, wherein said gathering step is performed by an agent.

4. The method of claim 1, wherein said hunting step is performed by an agent.

5. The method of claim 1, comprising normalizing the data before the data is placed in the data stream.

6. The method of claim 1, wherein the at least one data stream includes message traffic.

7. The method of claim 1, comprising linking the hunted data with a location where the hunted data was located.

8. The method of claim 7, comprising updating the received hunted data with new hunted data as new data is received at the hunted data location.

9. The method of claim 4, comprising constructing an event stream object which is forwarded to the computer by the agent.

10. The method of claim 9, wherein the event stream object includes information descriptive of an event.

11. The method of claim 10, wherein the information includes at least one of the following: the time that the event occurred; the duration that event covered; and key words that describe the event.

12. The method of claim 1, comprising filing the sorted information in separate data stream files.

13. The method of claim 1, wherein an event is comprised of at least one of the following elements: type, title, datetime, keywords, summary, priority and duration.

14. The method of claim 1, wherein a rule includes a criteria component and an action component.

15. The method of claim 14, wherein the criteria component includes at least one criteria statement and to satisfy a rule either all, any or none of the at least one criteria statements need to be satisfied.

16. The method of claim 15, wherein at least one action is taken if the at least one rule is satisfied.

17. The method of claim 1, wherein the data in the event data stream is received in a standardized format.

18. The method of claim 12, comprising displaying an event stream using information stored in stored data stream files.

19. The method of claim 18, comprising displaying an event stream using a received sorted data stream.

20. An article usable to monitor a computer network for specified events at a presence, comprising:
    at least one sequence of machine executable instructions;
    a medium bearing the executable instructions in machine readable form, wherein execution of the instructions by one or more processors causes the one or more processors to:
        gather data at two or more remote computers and place the gathered data in a respective data stream to the presence;
        receive at least one data stream at the presence, the data stream including data representative of events;
        apply rules to the data stream at the presence, for sorting data representative of events and for taking one or more actions based on a specified event; and
        hunt for predetermined data at a remote computer and place the hunted data in a data stream and forward the data stream to the presence.

21. The article of claim 20, comprising causing the processor to display events associated with a selected data stream on a time line.

22. A computer architecture for monitoring a computer network at a presence for specified events, comprising:
  gathering means, at two or more remote computers, for gathering data and placing the data in a respective data stream and forwarding the data stream to the presence;
  receiving means, at the presence, for receiving at least one data stream at a computer, the data stream including data representative of events; and
  applying means, at the presence, for applying rules to the at least one data stream for sorting data representative of events and for taking one or more actions based on a specified event;
  wherein hunting data at two or more remote computers and forwarding the hunted data in a respective data stream to the presence.

23. The computer architecture of claim 22, comprising displaying means for displaying events associated with a selected data stream on a time line.

24. A computer system usable to monitor a computer network for specified events at a presence, comprising:
  a processor; and
  a memory coupled to said processor, the memory having stored therein sequences of instructions, which, when executed by said processor, causes said processor to perform the steps of:
    gathering data at two or more remote computers and placing the gathered data in a respective data stream to the presence;
    receiving at last one data stream at the presence, the data stream including data representative of events; and
    applying rules to the data stream at the presence for sorting data representative of events and for taking one or more actions based on a specified event;
    wherein hunting data in at two or more remote computers and forwarding the hunted data in a data stream to the presence.

25. The computer system of claim 24, comprising causing the processor to display events associated with a selected data stream on a time line.

26. A method of monitoring a computer network for specified events at a presence, comprising:
  gathering heterogeneous data at two or more remote computers and placing the gathered data in a data stream and forwarding the data stream to the presence;
  receiving, at the presence, the at least one data stream sent from the two or more remote computers, the data stream including data representative of events; and
  applying rules to the at least one data stream at the presence for sorting data representative of events and for taking one or more actions based on a specified event;
  wherein the gathered data is gathered from multiple heterogeneous sources.

27. The method of claim 1, wherein the hunted data is hunted from multiple heterogeneous sources.

28. A method of monitoring a computer network for specified events, comprising:
  hunting for predetermined data at two or more remote computers and placing the hunted data in a respective data stream and forwarding the data stream to the presence;
  receiving, at the presence, the two or more data streams sent from two or more remote computers, the data stream including data representative of events; and
  applying rules to the at least one data stream at the presence for sorting data representative of events and for taking one or more actions based on a specified event.

29. The method of claim 28, comprising gathering data at two or more remote computers and placing the gathered data in a respective data stream and forwarding the data stream to the presence.

30. The method of claim 28, wherein the hunted data is hunted from multiple heterogeneous sources.

31. The method of claim 29, wherein the gathered data is gathered from multiple heterogeneous sources.

32. The method of claim 1, wherein said gathering step includes collecting/generating data at the two or more remote computers.

33. The method of claim 1, wherein said gathering and receiving step are performed in real-time.

* * * * *